US010909232B2

(12) United States Patent
Duan et al.

(10) Patent No.: US 10,909,232 B2
(45) Date of Patent: Feb. 2, 2021

(54) TERMINAL VERIFICATION METHOD, TERMINAL DEVICE, AND COMPUTER READABLE STORAGE MEDIUM

(71) Applicant: ZHUHAI JUNTIAN ELECTRONIC TECHNOLOGY CO., LTD., Guangdong (CN)

(72) Inventors: Zhengyang Duan, Beijing (CN); Honglei Chu, Beijing (CN); Liming Zhang, Beijing (CN); Chengzhi Jiang, Beijing (CN)

(73) Assignee: ZHUHAI JUNTIAN ELECTRONIC TECHNOLOGY CO., LTD., Guangdong (CN)

( * ) Notice: Subject to any disclaimer, the term of this patent is extended or adjusted under 35 U.S.C. 154(b) by 314 days.

(21) Appl. No.: 16/001,025

(22) Filed: Jun. 6, 2018

(65) Prior Publication Data

US 2019/0205522 A1     Jul. 4, 2019

(30) Foreign Application Priority Data

Dec. 29, 2017   (CN) .......................... 2017 1 1484619

(51) Int. Cl.
*G06F 21/44*       (2013.01)
*H04L 29/06*       (2006.01)
*G06F 11/07*       (2006.01)

(52) U.S. Cl.
CPC .......... *G06F 21/44* (2013.01); *G06F 11/0703* (2013.01); *H04L 63/0876* (2013.01); *H04L 63/12* (2013.01); *G06F 2221/2129* (2013.01)

(58) Field of Classification Search
CPC ................. G06F 21/44; G06F 11/0703; G06F 2221/2129; G06F 11/2247; H04L 63/0876; H04L 63/12
See application file for complete search history.

(56) References Cited

U.S. PATENT DOCUMENTS

2015/0106282 A1\*   4/2015  Lee ...................... G06Q 30/018
                                                                705/318
2019/0026469 A1\*   1/2019  Cremin ................... G06F 21/57
(Continued)

*Primary Examiner* — Matthew Smithers
*Assistant Examiner* — Mirza Israr Javed
(74) *Attorney, Agent, or Firm* — Osha Bergman Watanabe & Burton LLP

(57) ABSTRACT

Embodiments of the present disclosure provide a terminal verification method, a terminal device and a computer readable storage medium. The method includes: reading machine verification parameters of a target terminal, determining that the target terminal is incompletely configured in response to determining that the machine verification parameters of the target terminal satisfy a first condition and a second condition, and displaying on a user interface of the target terminal that, the target terminal is incompletely configured. The machine verification parameters of the target terminal include N terminal configuration parameters. The first condition includes abnormally reading the GPU manufacturer parameter and the GPU renderer parameter. The second condition includes normally reading a first group of terminal configuration parameters of the machine verification parameters of the target terminal. The first group of terminal configuration parameters includes (N-2) terminal configuration parameters.

15 Claims, 4 Drawing Sheets

(56) References Cited

U.S. PATENT DOCUMENTS

2019/0205522 A1* 7/2019 Duan ................ G06F 21/44
2019/0205572 A1* 7/2019 Duan ................ G06F 21/44
2019/0205896 A1* 7/2019 Duan ................ G06F 21/57

* cited by examiner

TERMINAL VERIFICATION METHOD, TERMINAL DEVICE, AND COMPUTER READABLE STORAGE MEDIUM

CROSS-REFERENCE TO RELATED APPLICATIONS

This application is based on and claims a priority to Chinese Patent Application No. 201711484619.4, filed on Dec. 29, 2017, the entire contents of which are incorporated herein by reference.

FIELD

The present disclosure relates to the field of computer, and more particularly, to a terminal verification method, a terminal device and a computer readable storage medium.

BACKGROUND

With continuous development of science and technology, terminals such as mobile phones are constantly enriching public's life. Since it is convenient and quick to use the terminal to process information, terminals have become an indispensable part of people's work and life. However, with popularity of terminals, imitation industries for the terminals are also quietly rising. As fakes, various fake terminals imitate styles and functions of certified terminals, making it difficult for consumers to distinguish differences between the fake terminals and the certified terminals, and increasing risks of consumers being cheated. Therefore, detection for authenticity of terminals has gradually been valued by people.

In the related art, in the process of detecting the terminal, it is required to detect various configuration parameters of the terminal, and compare respective configuration parameters with official configuration parameters of the certified terminal, so as to determine the authenticity of the terminal. However, due to compatibility of terminal systems or other problems, some configuration parameters of the terminal may not be detected, such that misdetection may occur, reliability of comparison results is reduced, and accuracy of the terminal detection is reduced.

SUMMARY

Embodiments of the present disclosure provide a terminal verification method, a terminal device and a computer readable storage medium.

According to a first aspect, there is provided a terminal verification method. The method includes: reading machine verification parameters of a target terminal, in which the machine verification parameters of the target terminal include N terminal configuration parameters, and the N terminal configuration parameters at least include a graphics processing unit (GPU) manufacturer parameter and a GPU renderer parameter; determining that the target terminal is incompletely configured in response to determining that the machine verification parameters of the target terminal satisfy a first condition and a second condition, in which the first condition includes abnormally reading the GPU manufacturer parameter and the GPU renderer parameter, the second condition includes normally reading a first group of terminal configuration parameters of the machine verification parameters of the target terminal, and the first group of terminal configuration parameters includes (N−2) terminal configuration parameters in the N terminal configuration parameters of the target terminal excluding the GPU manufacturer parameter and the GPU renderer parameter; and displaying on a user interface of the target terminal that, the target terminal is incompletely configured.

According to a second aspect, there is provided a terminal device. The terminal device includes: a machine verification parameter acquiring unit, a verifying unit and a display unit.

The machine verification parameter acquiring unit is configured to read machine verification parameters of a target terminal. The machine verification parameters of the target terminal include N terminal configuration parameters. The N terminal configuration parameters at least include a GPU manufacturer parameter and a GPU renderer parameter.

The verifying unit is configured to determine that the target terminal is incompletely configured in response to determining that the machine verification parameters of the target terminal acquired by the machine verification parameter acquiring unit satisfy a first condition and a second condition. The first condition includes abnormally reading the GPU manufacturer parameter and the GPU renderer parameter. The second condition includes normally reading a first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter.

The display unit is configured to display on a user interface of the target terminal that, the target terminal is incompletely configured.

According to a third aspect, there is provided a terminal device. The terminal device includes a processor, an input device, an output device and a memory. The processor, the input device, the output device and the memory are coupled to each other. The memory is configured to store a computer program including program instructions. The processor is configured to invoke the program instructions to perform the terminal verification method described in the first aspect.

According to a fourth aspect, there is provided a computer readable storage medium. The computer readable storage medium is configured to store a computer program including program instructions. When the program instructions are executed by a processor, the processor is caused to perform the terminal verification method described in the first aspect.

According to a fifth aspect, there is provided a computer program. The computer program includes program instructions. When the program instructions are executed by a processor, the processor is caused to perform the terminal verification method described in the first aspect.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

Reference will be made clearly and completely technical solutions in embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

Figure 1:
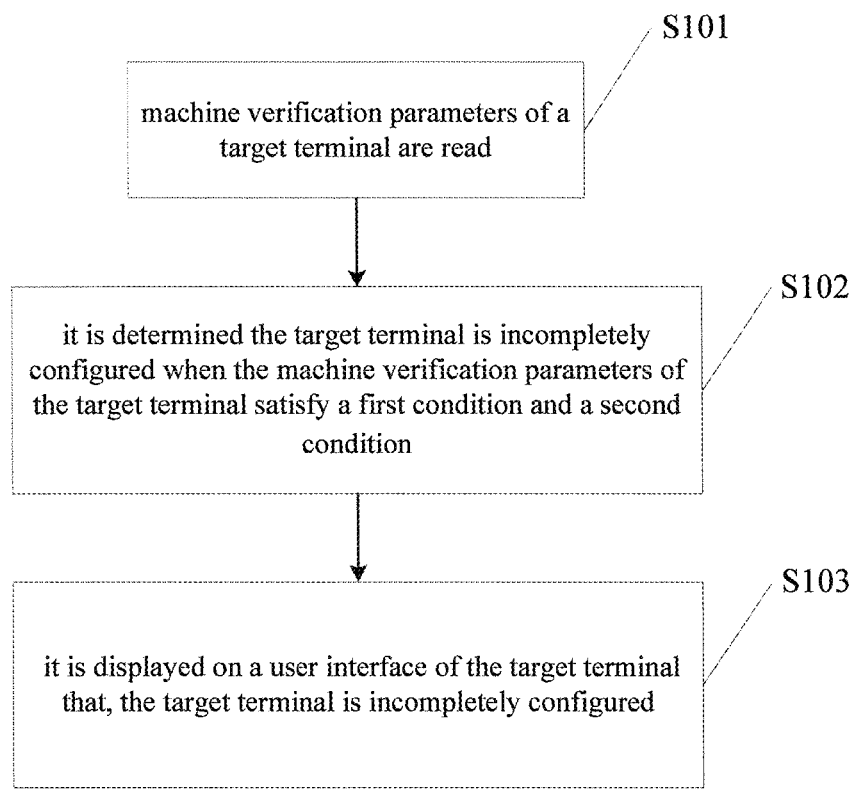
FIG. 1 is a flow chart of a first embodiment of a terminal verification method according to an embodiment of the present disclosure.

Referring to FIG. 1, which is a flow chart of a first embodiment of a terminal verification method according to an embodiment of the present disclosure. In this embodiment, a terminal device is described as an execution subject. The terminal device may include a device having a display device such as a mobile phone, a laptop computer, a tablet computer, or the like, which is not limited herein. As illustrated in FIG. 1, the terminal verification method may include followings.

At block S101, machine verification parameters of a target terminal are read.

In some possible implementations, the machine verification parameters that need to be read by the target terminal may include N terminal configuration parameters such as a brand parameter, a model number parameter, a device number parameter, a capacity parameter, a system platform, a GPU manufacturer parameter, a GPU renderer parameter, etc., which are not limited herein. After a terminal device obtains an instruction inputted by a user for starting verification of the target terminal, in at least one embodiment, the terminal device can obtain the machine verification parameters of the target terminal through a device performance detection method. The target terminal may be the terminal device, and may also be a device connected with the terminal device other than the terminal device. For example, the terminal device can read preset identification information of a memory in a system of the target terminal, obtain a capacity parameter of the memory of the target terminal from the identification information, and take it as the capacity parameter of the target terminal. In at least one embodiment, the terminal device can also directly obtain preset machine verification parameters of the target terminal without through the device performance detection method. The machine verification parameters of the target terminal may be performance parameter values or ratio values obtained by converting the performance parameter values based on a preset conversion rule, which are not limited herein. It should be noted that, when the terminal device cannot obtain some configuration information of the target terminal, for example, the read configuration information is empty, NULL, or Unknown, it may be determined that the terminal configuration parameters corresponding to the configuration information in the machine verification parameters of the target terminal are abnormally read. Otherwise, it may be determined that the terminal configuration parameters corresponding to the configuration information in the machine verification parameters of the target terminal are normally read.

At block S102, it is determined that the target terminal is incompletely configured when the machine verification parameters of the target terminal satisfy a first condition and a second condition.

In some possible implementations, before the terminal device determines whether the target terminal is incompletely configured according to the first condition and the second condition, the terminal device can also determine the verification result of the target terminal according to the brand parameter in the machine verification parameters of the target terminal. The first condition includes abnormally reading the GPU manufacturer parameter and the GPU renderer parameter. The second condition includes normally reading a first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter.

In detail, the terminal device may first detect whether the brand parameter of the target terminal is in a preset fake machine brand parameter library. When the brand parameter of the target terminal is in the preset fake machine brand parameter library, it may be determined that the target terminal is a fake. The preset fake machine brand parameter library includes at least one brand parameter of a terminal as the fake. For example, assuming that the terminal device detects that a brand parameter 0PP0 (zero PP zero) is in the machine verification parameters of the target terminal, and then the terminal device also detects the brand parameter 0PP0 in the preset fake machine brand parameter library, the terminal device may determine that the target terminal is a fake.

In some possible implementations, the terminal device may determine whether the target terminal is incompletely configured according to the first condition and the second condition. The first group of terminal configuration parameters may include (N−2) terminal configuration parameters such as a brand parameter, a device number parameter, a mainboard model number parameter, a capacity parameter, a model number parameter, an operating platform parameter, a CPU hardware parameter, a screen parameter, a CPU ID, etc. In detail, the terminal device may detect whether the GPU manufacturer parameter and the GPU renderer parameter in the machine verification parameters of the target terminal are abnormally read. When the terminal device determines that the GPU manufacturer parameter and the GPU renderer parameter in the machine verification parameters of the target terminal are abnormally read, the terminal device may continue to determine whether the first group of terminal configuration parameters in the machine verification parameters of the target terminal is normally read. When the terminal device determines that the first group of terminal configuration parameters in the machine verification parameters of the target terminal is normally read, it is determined that the target terminal is incompletely configured.

In some possible implementations, when the terminal device determines that the machine verification parameters of the target terminal do not satisfy both the first condition and the second condition, the terminal device may determine a model of the target terminal according to the brand parameter, the model number parameter, the device number parameter and the capacity parameter in the first group of terminal configuration parameters. Then, the terminal device can obtain a first group of standard machine verification parameters from a preset first certified machine verification parameter library according to the model of the target terminal. The first group of standard machine verification parameters includes official parameters corresponding to the model of the target terminal. The first group of standard machine verification parameters may include (N−4) terminal configuration parameters such as a model number parameter, an operating platform parameter, a CPU hardware parameter, a screen parameter, a CPU 1D, a GPU manufactory parameter, a GPU renderer parameter, etc. The terminal device can calculate a similarity between a second group of terminal configuration parameters and the first group of standard machine verification parameters of the target terminal. When the similarity between the second group of terminal configuration parameters and the first group of standard machine verification parameters of the target terminal is greater than or equal to a preset similarity threshold, it is determined that the target terminal is a certified product, otherwise, it is determined that the target terminal is a fake. The second group of terminal configuration parameters of the target terminal includes (N−4) terminal configuration parameters in the N terminal configuration parameters excluding the brand parameter, the model number parameter, the device number parameter and the capacity parameter.

In detail, the first group of standard machine verification parameters includes (N−4) objective standard parameters, and each objective standard parameter in the (N−4) objective standard parameters corresponds to a weight value. For example, a certified terminal of a model SM-G995F corresponds to a group of standard machine verification parameters in the first certified machine verification parameter library, which is called the first group of standard machine verification parameters. The first group of standard machine verification parameters includes (N−4) configuration parameters of the certified terminal, such as a model number parameter, an operating platform parameter, a CPU hardware parameter, a screen parameter, etc. The (N−4) configuration parameters of the certified terminal are the objective standard parameters. The following is an example of any objective standard parameter A in the (N−4) objective standard parameters, and assuming that the weight of A is a. The terminal device may first determine whether the objective standard parameter A in the machine verification parameters of the target terminal is abnormally read. When the determination is yes, an objective similarity corresponding to the objective standard parameter A is 0. When the determination is no, the terminal device may detect whether a parameter value of the terminal configuration parameter corresponding to the objective standard parameter A in the target terminal is the same as the parameter value of the objective standard parameter A. When it is determined that the parameter value of the terminal configuration parameter corresponding to the objective standard parameter A in the target terminal is the same as the parameter value of the objective standard parameter A, it is determined that the objective similarity of A is a. When the parameter value of the terminal configuration parameter corresponding to the objective standard parameter A in the target terminal is different from the parameter value of the objective standard parameter A, it is determined that the objective similarity of A is 0. Similarly, the terminal device can obtain the sum of the objective similarity of each objective standard parameter in the first group of standard machine verification parameters. Then, the terminal device may detect whether the sum of the objective similarity is greater than or equal to a preset similarity threshold. When the sum of the objective similarity is greater than or equal to the preset similarity threshold, it is determined that the target terminal is a certified product, otherwise, it is determined that the target terminal is a fake.

At block S103, it is displayed on a user interface of the target terminal that, the target terminal is incompletely configured.

Figure 2:
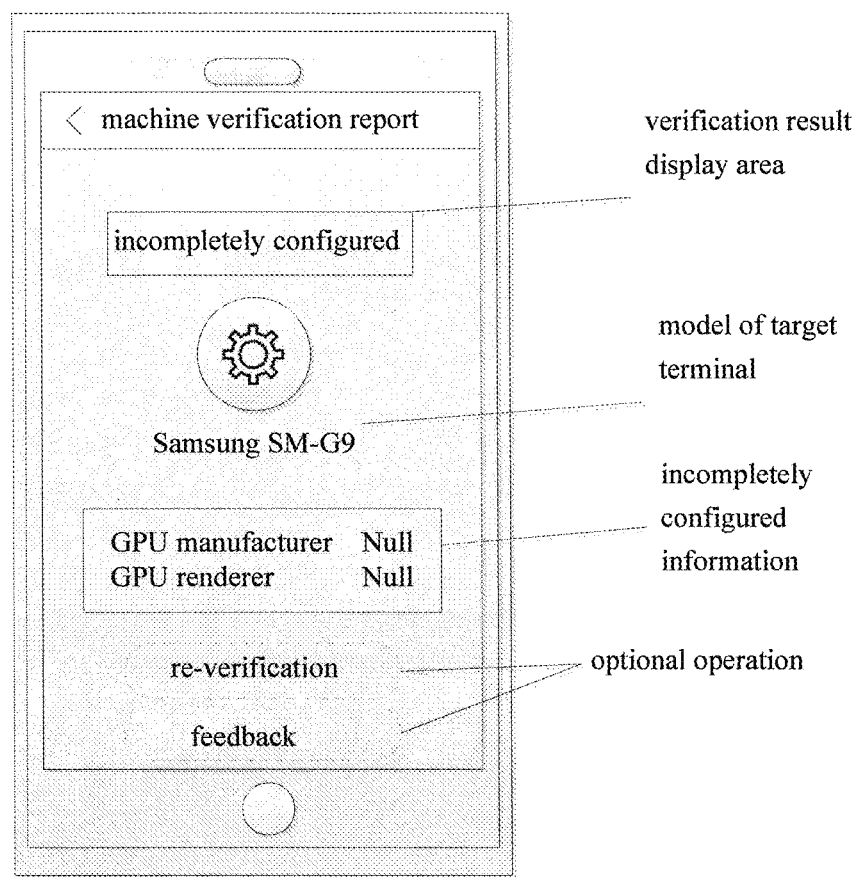
FIG. 2 is a schematic diagram of a display effect of a verification result according to an embodiment of the present disclosure.

In some possible implementations, after the terminal device obtains the verification result of the target terminal, the terminal device may output the verification result. In detail, the terminal device may display the verification result of the target terminal on its user interface. For example, please refer to FIG. 2, which is a schematic diagram of a display effect of a verification result according to an embodiment of the present disclosure. When the terminal device determines that the machine verification parameters of the target terminal satisfy the first condition and the second condition, it is determined that the target terminal is incompletely configured. The terminal device may prompt on its user interface that the target terminal is incompletely configured, and describe in detail which verification parameter is abnormally read. Moreover, the terminal device can also provide some options (such as re-verification or feedback) on its user interface for user selection. In at least one embodiment, after the terminal device obtains the verification result of the target terminal, the terminal device can broadcast the verification result of the target terminal through a voice broadcast function, without the user to check the verification result through the user interface of the terminal device, thereby improving user experience of the terminal device.

In embodiments of the present disclosure, the terminal device obtains the machine verification parameters of the target terminal. The machine verification parameters of the target terminal include N terminal configuration parameters. The N terminal configuration parameters at least include the GPU manufacturer parameter and the GPU renderer parameter. When it is determined that the machine verification parameters of the target terminal satisfy the first condition and the second condition, it is determined that the target terminal is incompletely configured. The first condition includes abnormally reading the GPU manufacturer parameter and the GPU renderer parameter. The second condition second condition includes normally reading the first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter. It is displayed on the user interface of the target terminal that, the target terminal is incompletely configured. In embodiments of the present disclosure, by obtaining the machine verification parameter of the target terminal, and determining that the target terminal is incompletely configured when the obtained machine verification parameters of the target terminal satisfy the first condition and the second condition, the probability of misdetection due to incomplete configuration parameters can be reduced, and accuracy of terminal detection can be improved.

Figure 3:
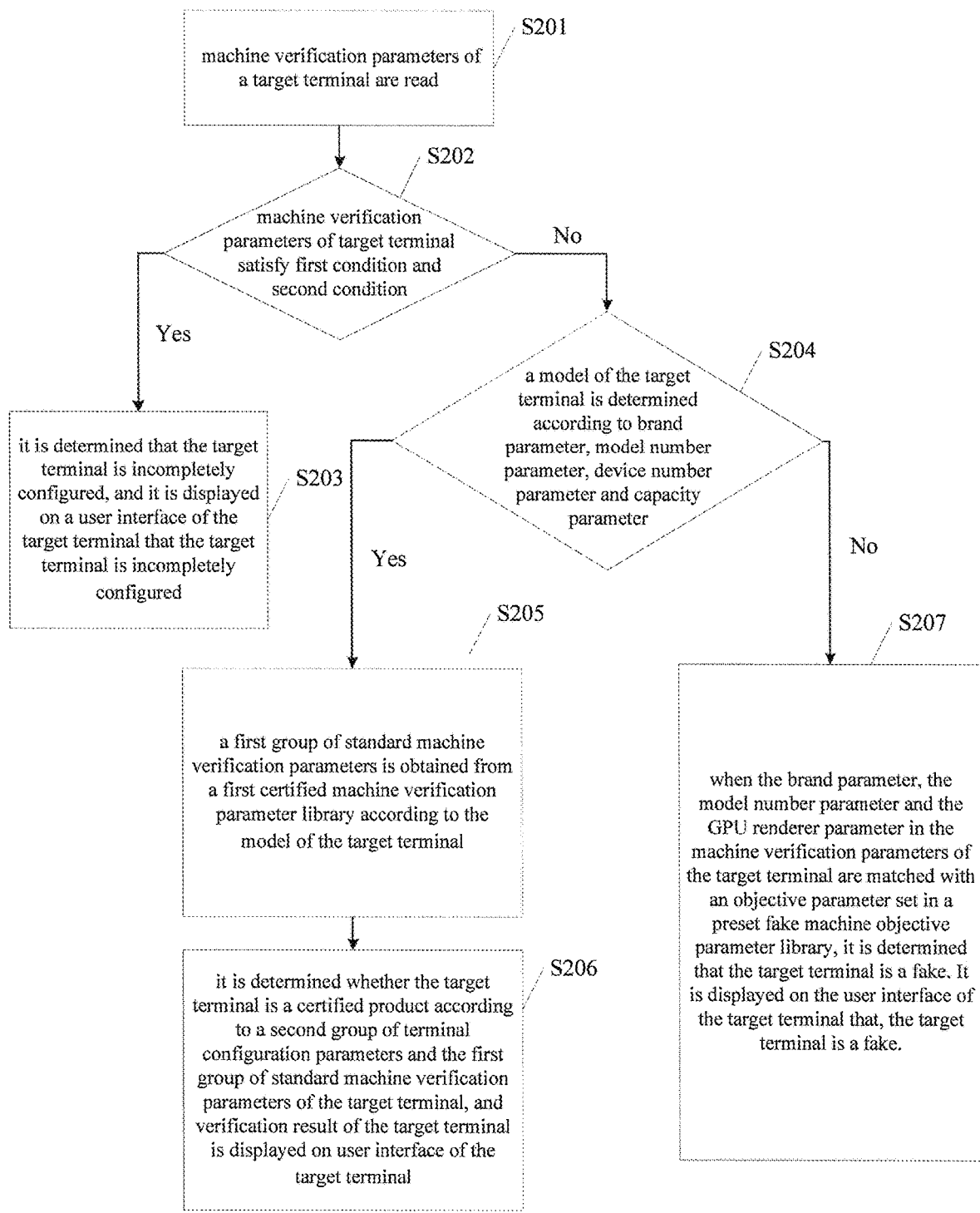
FIG. 3 is a flow chart of a second embodiment of a terminal verification method according to an embodiment of the present disclosure.

Referring to FIG. 3, which is a flow chart of a second embodiment of a terminal verification method according to an embodiment of the present disclosure. In this embodiment, a terminal device is described as an execution subject. The terminal device may include a device provided with a display device such as a mobile phone, a laptop computer, a tablet computer, or the like, which is not limited herein. As illustrated in FIG. 3, the terminal verification method may include followings.

At block S201, machine verification parameters of a target terminal are read.

In some possible implementations, the process of the terminal device reading the machine verification parameters of the target terminal can be seen in the process of obtaining the machine verification parameters of the target terminal described in block S101 in the first embodiment, which will not be described herein.

At block S202, it is determined whether the machine verification parameters of the target terminal satisfy a first condition and a second condition, when the determination is yes, block S203 is performed, and when the determination is no, block S204 is performed.

In some possible implementations, the machine verification parameters of the target terminal may include a brand parameter, a model number parameter, a device number parameter, a capacity parameter, a system platform, a GPU manufacturer parameter, a GPU renderer parameter, etc., which are not limited herein. After the machine verification parameters of the target terminal are obtained, the terminal device can determine whether the machine verification parameters of the target device satisfy the first condition and the second condition. The first condition includes abnormally reading the GPU manufacturer parameter and the GPU renderer parameter. The second condition includes normally reading a first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter. When the determination is yes, block S203 is performed. When the determination is no, block S204 is performed.

At block S203, it is determined that the target terminal is incompletely configured, and it is displayed on a user interface of the target terminal that the target terminal is incompletely configured.

In some possible implementations, after the terminal device determines that the target terminal is incompletely configured, the terminal device may prompt on its user interface that the target terminal is incompletely configured, and describe in detail which verification parameter is abnormally read. Moreover, the terminal device can also provide some options (such as re-verification or feedback) on its user interface for user selection. Please refer to FIG. 2 for specific effects.

At block S204, it is determined whether a model of the target terminal can be determined according to the brand parameter, the model number parameter, the device number parameter and the capacity parameter.

In some possible implementations, when the terminal device determines that the machine verification parameters of the target terminal do not satisfy both the first condition and the second condition, the terminal device can determine whether the model of the target terminal can be determined according to the brand parameter, the model number parameter, the device number parameter and the capacity parameter. When the model of the target terminal can be determined according to the brand parameter, the model number parameter, the device number parameter and the capacity parameter, block S205 is performed, otherwise block S207 is performed.

At block S205, a model of the target terminal is determined according to a brand parameter, a model number parameter, a device number parameter and a capacity parameter, and a first group of standard machine verification parameters is obtained from a first certified machine verification parameter library according to the model of the target terminal.

In some possible implementations, the terminal device can determine the model of the target terminal according to the brand parameter, the model number parameter, the device number parameter and the capacity parameter, and obtain the first group of standard machine verification parameters from the first certified machine verification parameter library according to the model of the target terminal. For example, assuming that a brand parameter is Samsung, a model number parameter is Galaxy S8, a device number parameter is XXXXXX and a capacity parameter is 64 GB in the first group of terminal configuration parameters. The terminal device may first determine that the approximate model of the target terminal is Galaxy S8 according to the brand parameter and the model number parameter. Then, the terminal device may determine that the model of the target terminal is Galaxy S8 (SM-G9) according to the device number parameter and the capacity parameter. When the terminal device determines that the model of the target terminal is Galaxy S8 (SM-G9), the terminal device can acquire the first group of standard machine verification parameters of Galaxy S8 (SM-G9) from an official standard configuration parameter library (i.e., the first certified machine verification parameter library) provided by Samsung. The first group of standard machine verification parameters may include the brand parameter, the model number parameter, the device number parameter, the capacity parameter, the system platform, the GPU manufacture parameter and the GPU renderer parameter.

At block S206, it is determined whether the target terminal is a certified product according to a second group of terminal configuration parameters and the first group of standard machine verification parameters of the target terminal, and a verification result of the target terminal is displayed on the user interface of the target terminal.

In some possible implementations, after the terminal device obtains the first group of standard machine verification parameters corresponding to the model of the target terminal, the terminal device can calculate a similarity between a second group of terminal configuration parameters and the first group of standard machine verification parameters of the target terminal. When the similarity between the second group of terminal configuration parameters and the first group of standard machine verification parameters of the target terminal is greater than or equal to a preset similarity threshold, it is determined that the target terminal is a certified product, otherwise, it is determined that the target terminal is a fake. The second group of terminal configuration parameters of the target terminal includes (N−4) terminal configuration parameters in the N terminal configuration parameters excluding the brand parameter, the model number parameter, the device number parameter and the capacity parameter. The process of the terminal device determining whether the target terminal is a certified product according to the similarity between the second group of terminal configuration parameters and the first group of standard machine verification parameters of the target terminal can be seen in the process of determining whether the target terminal is a certified product according to the similarity between the second group of terminal configuration parameters and the first group of standard machine verification parameters of the target terminal described in block S102 in the first embodiment, which will not be described herein. After the terminal device determines the verification result of the target terminal, the terminal device can display the verification result of the target terminal on its user interface. Moreover, the terminal device can also provide some options (such as re-verification or feedback) on its user interface for user selection.

At block S207, when the brand parameter, the model number parameter and the GPU renderer parameter in the machine verification parameters of the target terminal are matched with an objective parameter set in a preset fake machine objective parameter library, it is determined that the target terminal is a fake. It is displayed on the user interface of the target terminal that, the target terminal is a fake.

In some possible implementations, when the terminal device cannot determine the model of the target terminal according to the brand parameter, the model number parameter, the device number parameter and the capacity parameter, the terminal device may detect whether the brand parameter, the model number parameter and GPU renderer parameter of the target terminal are matched with any objective parameter set in the preset fake machine objective parameter library. The preset fake machine objective parameter library includes one or more objective parameter sets each including the brand parameter, the model number parameter and the GPU parameter of the fake terminal. When the terminal device detects that the brand parameter, the model number parameter and the GPU renderer parameter of the target terminal are matched with an objective parameter set in the preset fake machine objective parameter library, the terminal device may determine that target terminal is a fake. Then, the terminal device may display the verification result of the target terminal on its user interface. Moreover, the terminal device may also provide some options (such as re-verification or feedback) on its user interface for user selection. When the terminal device determines that the brand parameter, the model number parameter and GPU renderer parameter are not matched with any objective parameter set in the preset fake machine objective parameter library, the terminal device may detect whether any one or more of the brand parameter, the model number parameter, the device number parameter and the capacity parameter in the machine verification parameters of the target terminal are abnormally read. When the determination is yes, it is determined that the target terminal is incompletely configured. Then, the terminal device may display on its user interface that the target terminal is incompletely configured. Moreover, the terminal device may also provide some options (such as re-verification or feedback) on its user interface for user selection. In at least one embodiment, when the terminal device determines that any one of the brand parameter, the model number parameter, the device number parameter and the capacity parameter in the machine verification parameters of the target terminal is normally read, the terminal device can determine the model of the target terminal according to the brand parameter, the model number parameter, the device number parameter and the capacity parameter, and obtain a second group of standard machine verification parameters from a second certified machine verification parameter library according to the model of the target terminal. The process of the terminal device obtaining the second group of standard machine verification parameters according to the brand parameter, the model number parameter, the device number parameter and the capacity parameter, can be seen in the process of the terminal device obtaining the first group of standard machine verification parameters according to the brand parameter, the model number parameter, the device number parameter and the capacity parameter described in block S102 in the first embodiment, which will not be described herein. Then, the terminal device can determine the verification result of the target terminal according to the second group of terminal configuration parameters and the second group of standard machine verification parameters of the target terminal. The process of the terminal device determining the verification result of the target terminal according to the second group of terminal configuration parameters and the second group of standard machine verification parameters of the target terminal can be seen in the process of the terminal device determining the verification result of the target terminal according to the second group of terminal configuration parameters and the first group of standard machine verification parameters of the target terminal described in block S102 in the first embodiment, which will not described herein. In at least one embodiment, the verification result of the target terminal determined by the terminal device according to the second group of terminal configuration parameters and the second group of standard machine verification parameters of the target terminal may at least include three types of a certified product, a fake, or being unidentified.

In embodiments of the present disclosure, the terminal device obtains the machine verification parameters of the target terminal. The machine verification parameters of the target terminal include N terminal configuration parameters. The N terminal configuration parameters at least include the GPU manufacturer parameter and the GPU renderer parameter. When it is determined that the machine verification parameters of the target terminal satisfy the first condition and the second condition, it is determined that the target terminal is incompletely configured. The first condition includes abnormally reading the GPU manufacturer parameter and the GPU renderer parameter. The second condition second condition includes normally reading the first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter. It is displayed on the user interface of the target terminal that, the target terminal is incompletely configured. In embodiments of the present disclosure, by obtaining the machine verification parameter of the target terminal, and determining that the target terminal is incompletely configured when the obtained machine verification parameters of the target terminal satisfy the first condition and the second condition, the probability of misdetection due to incomplete configuration parameters can be reduced, and accuracy of terminal detection can be improved.

Figure 4:
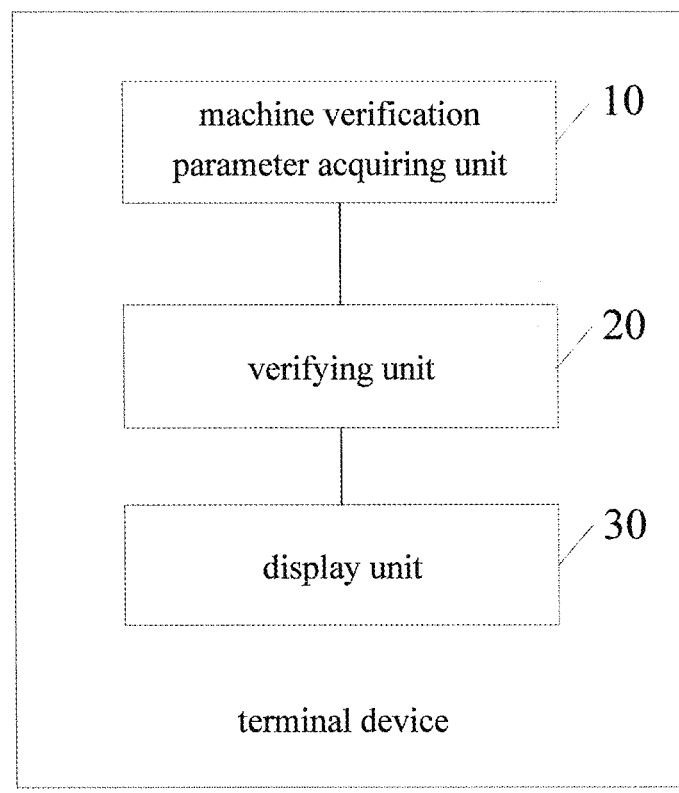
FIG. 4 is a block diagram of a terminal according to an embodiment of the present disclosure.

Referring to FIG. 4, which is a block diagram of a terminal device according to an embodiment of the present disclosure. The terminal device includes a machine verification parameter acquiring unit 10, a verifying unit 20 and a display unit 30.

The machine verification parameter acquiring unit 10 is configured to read machine verification parameters of a target terminal. The machine verification parameters of the target terminal include N terminal configuration parameters. The N terminal configuration parameters at least include a GPU manufacturer parameter and a GPU renderer parameter.

The verifying unit 20 is configured to determine that the target terminal is incompletely configured in response to determining that the machine verification parameters of the target terminal acquired by the machine verification parameter acquiring unit 10 satisfy a first condition and a second condition. The first condition includes abnormally reading the GPU manufacturer parameter and the GPU renderer parameter. The second condition includes normally reading a first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter.

The display unit 30 is configured to display on a user interface of the target terminal that, the target terminal is incompletely configured.

In some possible implementations, before it is determined that the target terminal is incompletely configured in response to determining that the machine verification parameters of the target terminal satisfy the first condition and the second condition, the verifying unit 20 is further configured to: in response to detecting that a brand parameter of the target terminal acquired by the machine verification parameter acquiring unit 10 is in a preset fake machine brand parameter library, determine that the target terminal is a fake, in which the preset fake machine brand parameter library includes at least one brand parameter of a terminal as the fake; and in response to detecting that the brand parameter of the target terminal is not in the preset fake machine brand parameter library, determine that the target terminal is incompletely configured in response to determining that the machine verification parameters of the target terminal satisfy the first condition and the second condition.

In some possible implementations, in response to determining that the machine verification parameters of the target terminal do not satisfy both the first condition and the second condition, the verifying unit 20 is configured to: determine a model of the target terminal according to a brand parameter, a model number parameter, a device number parameter and a capacity parameter in the first group of terminal configuration parameters of the target terminal, and obtain a first group of standard machine verification parameters from a first certified machine verification parameter library according to the model of the target terminal; and determine whether the target terminal is a certified product or a fake according to a second group of terminal configuration parameters and the first group of standard machine verification parameters of the target terminal. The second group of terminal configuration parameters includes (N−4) terminal configuration parameters in the N terminal configuration parameters excluding the brand parameter, the model number parameter, the device number parameter and the capacity parameter.

In some possible implementations, the verifying unit 20 is configured to: calculate a similarity between the second group of terminal configuration parameters and the first group of standard machine verification parameters of the target terminal; determine that the target terminal is a certified product when the similarity between the second group of terminal configuration parameters and the first group of standard machine verification parameters of the target terminal is greater than or equal to a preset similarity threshold, and determine that the target terminal is a fake when the similarity between the second group of terminal configuration parameters and the first group of standard machine verification parameters of the target terminal is less than the preset similarity threshold.

In some possible implementations, when the model of the target terminal cannot be determined according to the brand parameter, the model number parameter, the device number parameter and the capacity parameter, the verifying unit 20 is further configured to determine that the target terminal is a fake when the brand parameter, the model number parameter and the GPU renderer parameter of the target terminal acquired by the machine verification parameter acquiring unit 10 are matched with an objective parameter set in a preset fake machine objective parameter library. The preset fake machine objective parameter library includes one or more objective parameter sets each including the brand parameter, the model number parameter and the GPU parameter of the fake terminal.

In some possible implementations, when the brand parameter, the model number parameter and the GPU renderer parameter cannot be matched with any objective parameter set in the preset fake machine objective parameter library, the verifying unit 20 is further configured to determine that the target terminal is incompletely configured when any one or more of the brand parameter, the model number parameter, the device number parameter and the capacity parameter of the target terminal are abnormally read.

The display unit 30 is configured to display on the user interface of the target terminal that, the target terminal is incompletely configured.

In some possible implementations, when the brand parameter, the model number parameter, the device number parameter and the capacity parameter in the first group of terminal configuration parameters of the target terminal are normally read, the verifying unit 20 is configured to: determine the model of the target terminal according to the brand parameter, the model number parameter, the device number parameter and the capacity parameter acquired by the machine verification parameter acquiring unit 10, and obtain a second group of standard machine verification parameters from a second certified machine verification parameter library; and determine a verification result of the target terminal according to the machine verification parameters of the target terminal and the second group of standard machine verification parameters.

In some possible implementations, the machine verification parameters that need to be read by the target terminal may include N terminal configuration parameters such as a brand parameter, a model number parameter, a device number parameter, a capacity parameter, a system platform, a GPU manufacturer parameter, a GPU renderer parameter, etc. After the machine verification parameter acquiring unit 10 obtains an instruction inputted by a user for starting verification of the target terminal, in at least one embodiment, the machine verification parameter acquiring unit 10 can obtain the machine verification parameters of the target terminal through a device performance detection method. For example, the machine verification parameter acquiring unit 10 can read preset identification information of a memory in a system of the target terminal, obtain a capacity parameter of the memory of the target terminal from the identification information, and take the capacity parameter of the memory as the capacity parameter of the target terminal. In at least one embodiment, the machine verification parameter acquiring unit 10 can also directly obtain preset machine verification parameters of the target terminal without through the device performance detection method. The machine verification parameters of the target terminal may be performance parameter values or ratio values obtained by converting the performance parameter values based on a preset conversion rule, which are not limited herein. It should be noted that, when the machine verification parameter acquiring unit 10 cannot obtain some configuration information of the target terminal, it may be determined that the terminal configuration parameters corresponding to the configuration information in the machine verification parameters of the target terminal are abnormally read. Otherwise, it may be determined that the terminal configuration parameters corresponding to the configuration information in the machine verification parameters of the target terminal are normally read.

In at least one embodiment, after the machine verification parameter acquiring unit 10 obtains machine verification parameters of the target terminal, the machine verification parameter acquiring unit 10 may transmit the machine verification parameters of the target terminal to the verifying unit 20. The verifying unit 20 may first detect whether a brand parameter of the target terminal is in a preset fake machine brand parameter library. When the brand parameter of the target terminal is in the preset fake machine brand parameter library, the verifying unit 20 may determine that the target terminal is a fake. The preset fake machine brand parameter library includes at least one brand parameter of a terminal as the fake. For example, assuming that the verifying unit 20 detects that a brand parameter 0PP0 (zero PP zero) is in the machine verification parameters of the target terminal, and then the verifying unit 20 also detects the brand parameter 0PP0 in the preset fake machine brand parameter library, the verifying unit 20 may determine that the target terminal is a fake. The display unit 30 may display the verification result of the target terminal acquired by the verifying unit 20 on its user interface.

After the machine verification parameter acquiring unit 10 obtains machine verification parameters of the target terminal, the machine verification parameter acquiring unit 10 may transmit the machine verification parameters of the target terminal to the verifying unit 20. The verifying unit 20 may direct determine whether the target terminal is incompletely configured according to the first condition and the second condition. The first group of terminal configuration parameters may include (N−2) terminal configuration parameters such as a brand parameter, a device number parameter, a mainboard model number parameter, a capacity parameter, a model number parameter, an operating platform parameter, a CPU hardware parameter, a screen parameter, a CPU ID, etc. In detail, the verifying unit 20 may detect whether the GPU manufacturer parameter and the GPU renderer parameter in the machine verification parameters of the target terminal are abnormally read. When the verifying unit 20 determines that the GPU manufacturer parameter and the GPU renderer parameter in the machine verification parameters of the target terminal are abnormally read, the verifying unit 20 may continue to determine whether the first group of terminal configuration parameters in the machine verification parameters of the target terminal is normally read. When the verifying unit 20 determines that the first group of terminal configuration parameters in the machine verification parameters of the target terminal is normally read, it is determined that the target terminal is incompletely configured. The display unit 30 may display the verification result of the target terminal acquired by the verifying unit 20 on its user interface.

When the verifying unit 20 determines that the machine verification parameters of the target terminal do not satisfy both the first condition and the second condition, the verifying unit 20 may determine that whether a model of the target terminal can be determined according to the brand parameter, the model number parameter, the device number parameter and the capacity parameter. When the model of the target terminal can be determined, and when the verifying unit 20 determines that the first group of terminal configuration parameters includes the brand parameter, the model number parameter, the device number parameter and the capacity parameter, the verifying unit 20 can determine the model of the target terminal according to the brand parameter, the model number parameter, the device number parameter and the capacity parameter. For example, assuming that a brand parameter is Samsung, a model number parameter is Galaxy S8, a device number parameter is XXXXXX and a capacity parameter is 64 GB in the first group of terminal configuration parameters. The verifying unit 20 can first determine that the approximate model of the target terminal is Galaxy S8 according to the brand parameter and the model number parameter. Then, the verifying unit 20 can determine that the model of the target terminal is Galaxy S8 (SM-G9) according to the device number parameter and the capacity parameter. When the verifying unit 20 determines that the model of the target terminal is Galaxy S8 (SM-G9), the verifying unit 20 can acquire the first group of standard machine verification parameters of Galaxy S8 (SM-G9) from an official standard configuration parameter library (i.e., the first certified machine verification parameter library) provided by Samsung. The first group of standard machine verification parameters may include (N−4) terminal configuration parameters such as a system platform, a GPU manufacture parameter, a GPU renderer parameter, etc. After the verifying unit 20 obtains the first group of standard machine verification parameters corresponding to the model of the target terminal, the verifying unit 20 can calculate a similarity between a second group of terminal configuration parameters and the first group of standard machine verification parameters of the target terminal. The second group of terminal configuration parameters of the target terminal includes (N−4) terminal configuration parameters in the N terminal configuration parameters excluding the brand parameter, the model number parameter, the device number parameter and the capacity parameter. When the similarity between the second group of terminal configuration parameters and the first group of standard machine verification parameters of the target terminal is greater than or equal to a preset similarity threshold, the verifying unit 20 determines that the target terminal is a certified product, otherwise, the verifying unit 20 determines that the target terminal is a fake. The process of the verifying unit 20 determining whether the target terminal is a certified product according to the similarity between the second group of terminal configuration parameters and the first group of standard machine verification parameters of the target terminal can be seen in the process of determining whether the target terminal is a certified product according to the similarity between the second group of terminal configuration parameters and the first group of standard machine verification parameters of the target terminal described in block S102 in the first embodiment, which will not be described herein. After the verifying unit 20 determines the verification result of the target terminal, the display unit 30 can display the verification result of the target terminal determined by the verifying unit 20 on the user interface. When the verifying unit 20 cannot determine the model of the target terminal according to the brand parameter, the model number parameter, the device number parameter and the capacity parameter, the verifying unit 20 may detect whether the machine verification parameters of the target terminal acquired by the machine verification parameter acquiring unit 10 include the brand parameter, the model number parameter and GPU renderer parameter. When the verifying unit 20 determines that the machine verification parameters of the target terminal include the brand parameter, the model number parameter and GPU renderer parameter, the verifying unit 20 can detect whether the brand parameter, the model number parameter and GPU renderer parameter of the target terminal are matched with any objective parameter set in a preset fake machine objective parameter library. The preset fake machine objective parameter library includes one or more objective parameter sets each including the brand parameter, the model number parameter and the GPU parameter of the fake terminal. When the verifying unit 20 detects that the brand parameter, the model number parameter and the GPU renderer parameter of the target terminal are matched with an objective parameter set in the preset fake machine objective parameter library, the verifying unit 20 may determine that target terminal is a fake. Then, the display unit 30 can display the verification result of the target terminal acquired by the verifying unit 20 on the user interface. Moreover, the display unit 30 can also provide some options (such as re-verification or feedback) on its user interface for user selection. When the verifying unit 20 determines that none of the objective parameter set in the preset fake machine objective parameter library is matched with the brand parameter, the model number parameter and GPU renderer parameter, the verifying unit 20 may detect whether any one or more of the brand parameter, the model number parameter, the device number parameter and the capacity parameter in the machine verification parameters of the target terminal are abnormally read. When the determination is yes, the verifying unit 20 determines that the target terminal is incompletely configured. Then, the display unit 30 may display on its user interface that the target terminal is incompletely configured. Moreover, the display unit 30 may provide some options (such as re-verification or feedback) on its user interface for user selection. In at least one embodiment, when the verifying unit 20 determines that any one of the brand parameter, the model number parameter, the device number parameter and the capacity parameter in the machine verification parameters of the target terminal is normally read, the verifying unit 20 can determine the model of the target terminal according to the brand parameter, the model number parameter, the device number parameter and the capacity parameter, and obtain a second group of standard machine verification parameters from a second certified machine verification parameter library according to the model of the target terminal. The process of the verifying unit 20 obtaining the second group of standard machine verification parameters according to the brand parameter, the model number parameter, the device number parameter and the capacity parameter can be seen in the process of obtaining the first group of standard machine verification parameters according to the brand parameter, the model number parameter, the device number parameter and the capacity parameter described in block S102 in the first embodiment, which will not be described herein. Then, the verifying unit 20 can determine the verification result of the target terminal according to the second group of terminal configuration parameters and the second group of standard machine verification parameters of the target terminal. The process of the verifying unit 20 determining the verification result of the target terminal according to the second group of terminal configuration parameters and the second group of standard machine verification parameters of the target terminal can be seen in the process of the terminal device determining the verification result of the target terminal according to the second group of terminal configuration parameters and the first group of standard machine verification parameters of the target terminal described in block S102 in the first embodiment, which will not described herein. In at least one embodiment, the verification result of the target terminal determined by the verifying unit 20 according to the second group of terminal configuration parameters and the second group of standard machine verification parameters of the target terminal may at least include three types of a certified product, a fake, or being unidentified.

In embodiments of the present disclosure, the terminal device obtains the machine verification parameters of the target terminal. The machine verification parameters of the target terminal include N terminal configuration parameters. The N terminal configuration parameters at least include the GPU manufacturer parameter and the GPU renderer parameter. When it is determined that the machine verification parameters of the target terminal satisfy the first condition and the second condition, it is determined that the target terminal is incompletely configured. The first condition includes abnormally reading the GPU manufacturer parameter and the GPU renderer parameter. The second condition second condition includes normally reading the first group of terminal configuration parameters of the machine verification parameters of the target terminal. The first group of terminal configuration parameters includes (N−2) terminal configuration parameters in the N terminal configuration parameters of the target terminal excluding the GPU manufacturer parameter and the GPU renderer parameter. It is displayed on the user interface of the target terminal that, the target terminal is incompletely configured. In embodiments of the present disclosure, by obtaining the machine verification parameter of the target terminal, and determining that the target terminal is incompletely configured when the obtained machine verification parameters of the target terminal satisfy the first condition and the second condition, the probability of misdetection due to incomplete configuration parameters can be reduced, and accuracy of terminal detection can be improved.

Figure 5:
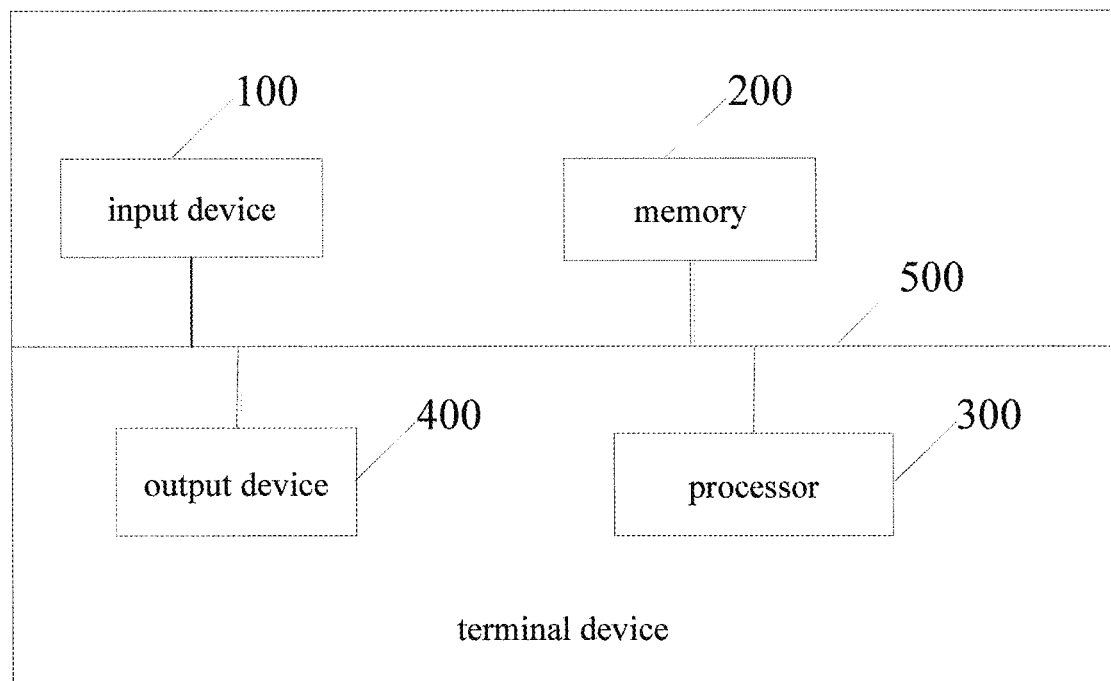
FIG. 5 is a block diagram of a terminal according to another embodiment of the present disclosure.

Referring to FIG. 5, which is a block diagram of another terminal device according to an embodiment of the present disclosure. As illustrated in FIG. 5, the terminal device in this embodiment may include one or more input devices 100, a memory 200, one or more processors 300 and one or more output devices 400. The processor 300, the input device 100, the output device 400 and the memory 200 are connected via a bus 500. The memory 200 is configured to store a computer program. The computer program includes program instructions. The processor 300 is configured to perform the program instructions stored in the memory 200. The processor 300 is configured to invoke the program instructions to perform: reading machine verification parameters of a target terminal, determining that the target terminal is incompletely configured in response to determining that the machine verification parameters of the target terminal satisfy a first condition and a second condition, and displaying on a user interface of the target terminal that, the target terminal is incompletely configured.

It should be understood that, in embodiments of the present disclosure, the processor 300 may be a central processing unit (CPU), and may also be other general purpose processor, Digital Signal Processor (DSP), Application Specific Integrated Circuit (ASIC), Field-Programmable Gate Array (FPGA), or other programmable logic device, discrete gate, or transistor logic device, discrete hardware component, or the like. The general purpose processor may be a microprocessor, or the processor may be any conventional processor or the like.

The input device 100 may include a touchpad, a fingerprint acquisition sensor (configured to acquire user's fingerprint information and fingerprint orientation information), a microphone, etc. The output device 400 may include a display (LCD, etc.), a loudspeaker, etc.

The memory 200 may include a read-only memory and a random access memory, and provide instructions and data to the processor 300. A portion of the memory 200 may also include a non-volatile random access memory. For example, the memory 200 may store device type information.

In an implementation, the processor 300, the input device 100 and the output device 200 described in embodiments of the present disclosure can perform implementations described in the first embodiment and the second embodiment of the terminal verification method provided by embodiments of the present disclosure, and can also perform implementations of the terminal device described in embodiments of the present disclosure, which will not be described herein.

In another embodiment of the present disclosure, there is provided a computer readable storage medium. The computer readable storage medium is configured to store a computer program. The computer program includes program instructions. When the program instructions are executed by a processor, following acts are performed: reading machine verification parameters of a target terminal, in which the machine verification parameters of the target terminal include N terminal configuration parameters, and the N terminal configuration parameters at least include a GPU manufacturer parameter and a GPU renderer parameter; determining that the target terminal is incompletely configured in response to determining that the machine verification parameters of the target terminal satisfy a first condition and a second condition, in which the first condition includes abnormally reading the GPU manufacturer parameter and the GPU renderer parameter, the second condition includes normally reading a first group of terminal configuration parameters of the machine verification parameters of the target terminal, and the first group of terminal configuration parameters includes (N−2) terminal configuration parameters in the N terminal configuration parameters of the target terminal excluding the GPU manufacturer parameter and the GPU renderer parameter; and displaying on a user interface of the target terminal that, the target terminal is incompletely configured.

The above-mentioned computer readable storage medium may be an internal storage unit of the terminal device described in any one of the above embodiments, such as a hard disk or a memory of the terminal device. The above-mentioned computer readable storage medium may also be an external storage device of the terminal device, such as a plug-in hard disk, a smart media card (SMC), a secure digital (SD) card or a Flash Cards equipped on the terminal device. Furthermore, the above-mentioned computer readable storage medium may also include both the internal storage unit and the external storage device of the terminal device. The above-mentioned computer readable storage medium is configured to store the above computer program and other programs and data required by the terminal device. The above-mentioned computer readable storage medium may also be configured to temporarily store data that has been outputted or to be outputted.

Those skilled in the art may be aware that, the exemplary units and algorithm steps described in embodiments of the present disclosure can be implemented by electronic hardware, computer software, or a combination of both. In order to clearly illustrate the interchangeability of hardware and software, the components and steps of each example have been generally described in terms of functions in the above specification. Whether these functions are performed in hardware or software depends on the specific application of the technical solutions and design constraint conditions. Those skilled in the art may use different methods to implement the described functions for each specific application, but the implementation should not be considered beyond the scope of the present disclosure.

Those skilled in the art can clearly understand that, for convenience and conciseness of description, the specific operating process of the terminal device and the unit described above may refer to the corresponding process in the foregoing method embodiment, and details are not described herein again.

In several embodiments provided by the present disclosure, it should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The foregoing descriptions are merely specific implementation manners of the present disclosure, but the protection scope of the present disclosure is not limited thereto. Various equivalent modifications or replacements that can easily be conceived by those skilled in the art within the technical scope of the present disclosure should be within the protection s scope of the present disclosure. Therefore, the protection scope of the present disclosure shall be subject to the protection scope of the claims.

What is claimed is:

1. A terminal verification method, comprising:
reading machine verification parameters of a target terminal, wherein the machine verification parameters of the target terminal comprise N terminal configuration parameters, and the N terminal configuration parameters at least comprise a graphics processing unit (GPU) manufacturer parameter and a GPU renderer parameter;
determining that the target terminal is incompletely configured in response to determining that the machine verification parameters of the target terminal satisfy a first condition and a second condition, wherein the first condition comprises abnormally reading the GPU manufacturer parameter and the GPU renderer parameter, the second condition comprises normally reading a first group of terminal configuration parameters of the machine verification parameters of the target terminal, and the first group of terminal configuration parameters comprises (N−2) terminal configuration parameters in the N terminal configuration parameters of the target terminal excluding the GPU manufacturer parameter and the GPU renderer parameter; and
displaying on a user interface of the target terminal that, the target terminal is incompletely configured.

2. The method according to claim 1, wherein before determining that the target terminal is incompletely configured in response to determining that the machine verification parameters of the target terminal satisfy the first condition and the second condition, the method further comprises:
in response to detecting that a brand parameter of the target terminal is in a preset fake machine brand parameter library, determining that the target terminal is a fake, wherein the preset fake machine brand parameter library comprises at least one brand parameter of a terminal as the fake; and
in response to detecting that the brand parameter of the target terminal is not in the preset fake machine brand parameter library, determining that the target terminal is incompletely configured in response to determining that the machine verification parameters of the target terminal satisfy the first condition and the second condition.

3. The method according to claim 1, further comprising:
in response to determining that the machine verification parameters of the target terminal do not satisfy both the first condition and the second condition, determining a model of the target terminal according to a brand parameter, a model number parameter, a device number parameter and a capacity parameter in the first group of terminal configuration parameters of the target terminal, and obtaining a first group of standard machine verification parameters from a first certified machine verification parameter library according to the model of the target terminal; and
determining whether the target terminal is a certified product or a fake according to a second group of terminal configuration parameters and the first group of standard machine verification parameters of the target terminal, wherein the second group of terminal configuration parameters comprises (N−4) terminal configuration parameters in the N terminal configuration parameters excluding the brand parameter, the model number parameter, the device number parameter and the capacity parameter.

4. The method according to claim 3, wherein determining whether the target terminal is a certified product or a fake according to the second group of terminal configuration parameters and the first group of standard machine verification parameters of the target terminal comprises:
calculating a similarity between the second group of terminal configuration parameters and the first group of standard machine verification parameters of the target terminal; and
determining that the target terminal is a certified product when the similarity between the second group of terminal configuration parameters and the first group of standard machine verification parameters of the target terminal is greater than or equal to a preset similarity threshold, and determining that the target terminal is a fake when the similarity between the second group of terminal configuration parameters and the first group of standard machine verification parameters of the target terminal is less than the preset similarity threshold.

5. The method according to claim 3, further comprising:
when the model of the target terminal cannot be determined according to the brand parameter, the model number parameter, the device number parameter and the capacity parameter, determining that the target terminal is a fake when the brand parameter, the model number parameter and the GPU renderer parameter of the target terminal are matched with an objective parameter set in a preset fake machine objective parameter library, wherein the preset fake machine objective parameter library comprises one or more objective parameter sets each comprising the brand parameter, the model number parameter and the GPU parameter of the fake terminal.

6. The method according to claim 5, further comprising:
when the brand parameter, the model number parameter and the GPU renderer parameter are not matched with any objective parameter set in the preset fake machine objective parameter library, determining that the target terminal is incompletely configured when any one or more of the brand parameter, the model number parameter, the device number parameter and the capacity parameter of the target terminal are abnormally read; and
displaying on the user interface of the target terminal that, the target terminal is incompletely configured.

7. The method according to claim 6, further comprising:
when the brand parameter, the model number parameter, the device number parameter and the capacity parameter in the first group of terminal configuration parameters of the target terminal are normally read, determining the model of the target terminal according to the brand parameter, the model number parameter, the device number parameter and the capacity parameter, and obtaining a second group of standard machine verification parameters from a second certified machine verification parameter library; and
determining a verification result of the target terminal according to the machine verification parameters of the target terminal and the second group of standard machine verification parameters.

8. A terminal device, comprising:
a processor; and
a memory, configured to store a computer program comprising program instructions;

wherein the processor is configured to:
read machine verification parameters of a target terminal, wherein the machine verification parameters of the target terminal comprise N terminal configuration parameters, and the N terminal configuration parameters at least comprise a GPU manufacturer parameter and a GPU renderer parameter;
determine that the target terminal is incompletely configured in response to determining that the machine verification parameters of the target terminal satisfy a first condition and a second condition, wherein the first condition comprises abnormally reading the GPU manufacturer parameter and the GPU renderer parameter, the second condition comprises normally reading a first group of terminal configuration parameters of the machine verification parameters of the target terminal, and the first group of terminal configuration parameters comprises (N−2) terminal configuration parameters in the N terminal configuration parameters of the target terminal excluding the GPU manufacturer parameter and the GPU renderer parameter; and
display on a user interface of the target terminal that, the target terminal is incompletely configured.

9. The terminal device according to claim 8, wherein before determining that the target terminal is incompletely configured in response to determining that the machine verification parameters of the target terminal satisfy the first condition and the second condition, the processor is configured to:
in response to detecting that a brand parameter of the target terminal is in a preset fake machine brand parameter library, determine that the target terminal is a fake, wherein the preset fake machine brand parameter library comprises at least one brand parameter of a terminal as the fake; and
in response to detecting that the brand parameter of the target terminal is not in the preset fake machine brand parameter library, determine that the target terminal is incompletely configured in response to determining that the machine verification parameters of the target terminal satisfy the first condition and the second condition.

10. The terminal device according to claim 8, wherein the processor is configured to:
in response to determining that the machine verification parameters of the target terminal do not satisfy both the first condition and the second condition, determine a model of the target terminal according to a brand parameter, a model number parameter, a device number parameter and a capacity parameter in the first group of terminal configuration parameters of the target terminal, and obtain a first group of standard machine verification parameters from a first certified machine verification parameter library according to the model of the target terminal; and
determine whether the target terminal is a certified product or a fake according to a second group of terminal configuration parameters and the first group of standard machine verification parameters of the target terminal, wherein the second group of terminal configuration parameters comprises (N−4) terminal configuration parameters in the N terminal configuration parameters excluding the brand parameter, the model number parameter, the device number parameter and the capacity parameter.

11. The terminal device according to claim 10, wherein the processor is configured to:
calculate a similarity between the second group of terminal configuration parameters and the first group of standard machine verification parameters of the target terminal; and
determine that the target terminal is a certified product when the similarity between the second group of terminal configuration parameters and the first group of standard machine verification parameters of the target terminal is greater than or equal to a preset similarity threshold, and determine that the target terminal is a fake when the similarity between the second group of terminal configuration parameters and the first group of standard machine verification parameters of the target terminal is less than the preset similarity threshold.

12. The terminal device according to claim 10, wherein the processor is further configured to:
when the model of the target terminal cannot be determined according to the brand parameter, the model number parameter, the device number parameter and the capacity parameter, determine that the target terminal is a fake when the brand parameter, the model number parameter and the GPU renderer parameter of the target terminal are matched with an objective parameter set in a preset fake machine objective parameter library, wherein the preset fake machine objective parameter library comprises one or more objective parameter sets each comprising the brand parameter, the model number parameter and the GPU parameter of the fake terminal.

13. The terminal device according to claim 12, wherein when the brand parameter, the model number parameter and the GPU renderer parameter are not matched with any objective parameter set in the preset fake machine objective parameter library, the processor is configured to:
determine that the target terminal is incompletely configured when any one or more of the brand parameter, the model number parameter, the device number parameter and the capacity parameter of the target terminal are abnormally read; and
display on the user interface of the target terminal that, the target terminal is incompletely configured.

14. The terminal device according to claim 13, wherein the processor is configured to:
when the brand parameter, the model number parameter, the device number parameter and the capacity parameter in the first group of terminal configuration parameters of the target terminal are normally read, determine the model of the target terminal according to the brand parameter, the model number parameter, the device number parameter and the capacity parameter, and obtain a second group of standard machine verification parameters from a second certified machine verification parameter library; and
determine a verification result of the target terminal according to the machine verification parameters of the target terminal and the second group of standard machine verification parameters.

15. A computer readable storage medium, configured to store a computer program comprising program instructions that, when executed by a processor, cause the processor to perform a terminal verification method, the method comprising:
reading machine verification parameters of a target terminal, wherein the machine verification parameters of the target terminal comprise N terminal configuration parameters, and the N terminal configuration parameters at least comprise a graphics processing unit (GPU) manufacturer parameter and a GPU renderer parameter;

determining that the target terminal is incompletely configured in response to determining that the machine verification parameters of the target terminal satisfy a first condition and a second condition, wherein the first condition comprises abnormally reading the GPU manufacturer parameter and the GPU renderer parameter, the second condition comprises normally reading a first group of terminal configuration parameters of the machine verification parameters of the target terminal, and the first group of terminal configuration parameters comprises (N−2) terminal configuration parameters in the N terminal configuration parameters of the target terminal excluding the GPU manufacturer parameter and the GPU renderer parameter; and displaying on a user interface of the target terminal that, the target terminal is incompletely configured.

* * * * *